United States Patent
Higgins (10) Patent No.: US 9,902,307 B2
(45) Date of Patent: Feb. 27, 2018

(54) STOWABLE LOAD SUPPORT STRUCTURE FOR TAILGATE

(71) Applicant: Toyota Motor Engineering & Manufacturing North America, Inc., Erlanger, KY (US)

(72) Inventor: Christopher M. Higgins, Ann Arbor, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 0 days.

(21) Appl. No.: 15/186,390

(22) Filed: Jun. 17, 2016

(65) Prior Publication Data
US 2017/0361757 A1    Dec. 21, 2017

(51) Int. Cl.
| B60P 7/15 | (2006.01) |
| B60J 5/10 | (2006.01) |
| B60P 3/40 | (2006.01) |
| B62D 33/03 | (2006.01) |

(52) U.S. Cl.
CPC .............. *B60P 7/15* (2013.01); *B60J 5/108* (2013.01); *B60P 3/40* (2013.01); *B62D 33/03* (2013.01)

(58) Field of Classification Search
CPC ...... B62D 25/08; B62D 25/087; B62D 33/03; B60R 9/06; B60P 7/15
USPC ................ 296/26.08–26.11, 3, 43, 37.6; 410/101–116
See application file for complete search history.

(56) References Cited

U.S. PATENT DOCUMENTS

| 4,531,773 | A |   | 7/1985 | Smith |
| 4,717,196 | A |   | 1/1988 | Adams |
| 4,930,834 | A | * | 6/1990 | Moore ............... B60Q 1/30 296/180.1 |
| 5,468,038 | A |   | 11/1995 | Sauri |
| 5,887,932 | A |   | 3/1999 | Pier, II |
| 6,149,219 | A | * | 11/2000 | Schambre ........ B62D 33/0273 296/26.11 |
| 6,942,272 | B2 | * | 9/2005 | Livingston ........ B62D 33/027 296/57.1 |
| 7,530,619 | B1 | * | 5/2009 | Bruford ............. B60R 3/02 296/1.02 |
| 9,387,812 | B2 | * | 7/2016 | Bexar ............... B60R 9/06 |
| 2003/0075943 | A1 | * | 4/2003 | Kirchhoff .......... B60P 3/14 296/26.11 |
| 2004/0227368 | A1 | * | 11/2004 | Seksaria ........... B62D 33/0273 296/26.1 |
| 2008/0231067 | A1 | * | 9/2008 | Nagle ................ B60P 3/07 296/50 |
| 2009/0273202 | A1 | * | 11/2009 | Heaman ........... B62D 33/0273 296/26.1 |
| 2015/0336622 | A1 | * | 11/2015 | Worden ............ B62D 33/0273 280/163 |

* cited by examiner

*Primary Examiner* — Dennis H Pedder
(74) *Attorney, Agent, or Firm* — Christopher G. Darrow; Darrow Mustafa PC (57) ABSTRACT

A load support structure is provided for a vehicle tailgate. The structure includes a base incorporated into the tailgate, a first retaining member positionable in either of a stowed configuration and a raised configuration within a cavity formed in the base, and a second retaining member positionable in either of a stowed configuration and a raised configuration within a cavity formed in the base.

17 Claims, 12 Drawing Sheets

STOWABLE LOAD SUPPORT STRUCTURE FOR TAILGATE

TECHNICAL FIELD

The embodiments described herein relate to support structures for loads located in the cargo bed of a pickup truck.

BACKGROUND

Pickup trucks may be used to transport various types of cargo. These trucks generally have a flat bed or floor near the rear of the vehicle, into which the cargo can be loaded. A rear door or tailgate provides access to the bed and may be opened and closed for loading. In the closed condition, the tailgate keeps cargo from rolling or falling out of the bed. However, certain types of cargo may occupy more floor space than may be available in the cargo bed. The trucks may be designed so that, when the tailgate is folded down for cargo loading, an interior surface of the tailgate is level with the bed floor.

Certain devices have been designed to allow a lowered tailgate to serve as an extension of the bed. These devices allow loaded cargo to extend past the end of the bed and to occupy a portion of the folded-down tailgate interior surface when the tailgate is down, while preventing the cargo from falling out of the bed. However, such devices rend to be relatively heavy, bulky, and difficult and time-consuming to set up.

SUMMARY

In one aspect of the embodiments described herein, a load support structure is provided for a vehicle tailgate. The structure includes a base incorporated into the tailgate, a first retaining member positionable in either of a stowed configuration and a raised configuration within a cavity formed in the base, and a second retaining member positionable in either of a stowed configuration and a raised configuration within a cavity formed in the base.

In another aspect of the embodiments described herein, a load support structure for a vehicle tailgate is provided. The structure includes a base formed separately from the tailgate, a first retaining member operatively coupled to the base so as to be movable between a stowed configuration and a raised configuration, and a second retaining member operatively coupled to the base so as to be movable between a stowed configuration and a raised configuration.

DETAILED DESCRIPTION

The embodiments described herein relate to a load support structure for a vehicle tailgate. The structure includes a base incorporated into the tailgate, a first retaining member positionable in either of a stowed configuration and a raised configuration within a cavity formed in the base, and a second retaining member positionable in either of a stowed configuration and a raised configuration within a cavity formed in the base. Thus, the same cavity may contain a retaining member in either configuration. The term "incorporated into the tailgate" means that the base is part of the tailgate. This may be accomplished by, for example, forming the base integrally (i.e., as a single piece) with one or more of the structural elements forming the tailgate, or by attaching the base to another element of the tailgate so that both elements move together, as part of the tailgate. The load support structure embodiments permit a lowered pickup truck rear door or tailgate to serve as an extension of the truck bed floor. These devices allow loaded cargo to extend past the end of the bed and to occupy a portion of the folded-down tailgate interior surface when the tailgate is down, while preventing the cargo from falling out of the bed. The load support structure may be built into the tailgate structure, or the load support structure may be added or retrofit onto an existing pickup truck.

Figure 1:
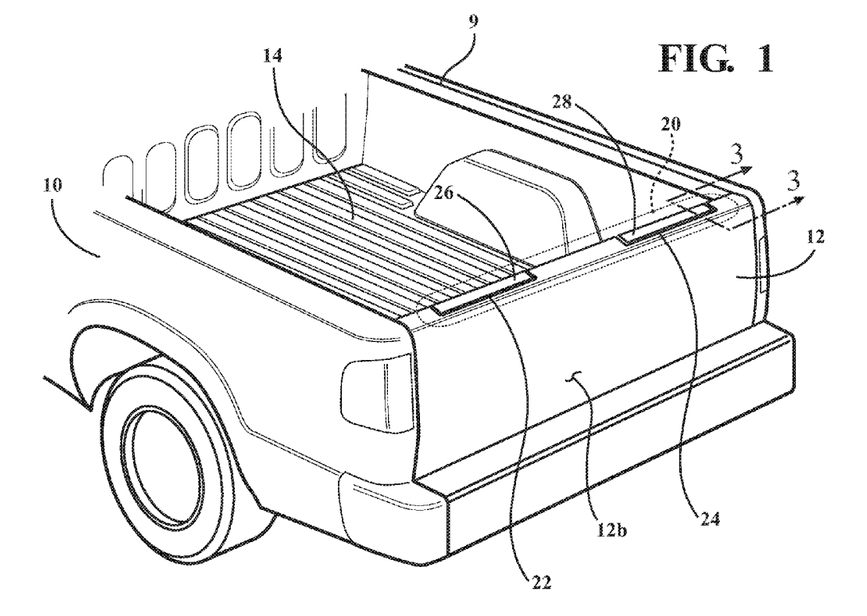
FIG. 1 is a perspective view of a rear portion of a vehicle incorporating a load support structure in accordance with an embodiment described herein, showing a vehicle tailgate in a closed or raised orientation.

FIG. 1 is a perspective view of a rear portion of a vehicle incorporating a load support structure in accordance with an embodiment described herein. In embodiment shown in FIG. 1, vehicle 10 is in the form of a pickup truck and includes a tailgate 12 providing access to a bed 14 of the pickup truck. Tailgate 12 is rotatably attached to the body or frame of the vehicle 10 so as to be movable between multiple component angular orientations relative to the body or frame. For example, the tailgate may be movable between an up, closed orientation (shown in FIG. 1) in which the tail gate is latched to the body of the vehicle 10 to close the bed of the vehicle 10, and a down, open orientation (shown in FIG. 2) in which the tailgate has been unlatched and dropped approximately 90 degrees to provide better access to the truck bed for loading and unloading.

Figure 2:
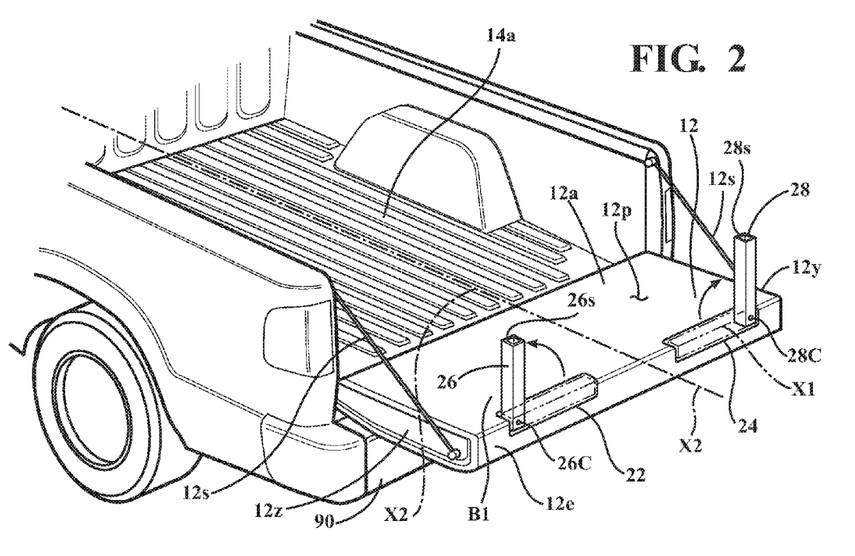
FIG. 2 is the perspective view of FIG. 1 showing the tailgate in a down or open orientation.
Figure 3:
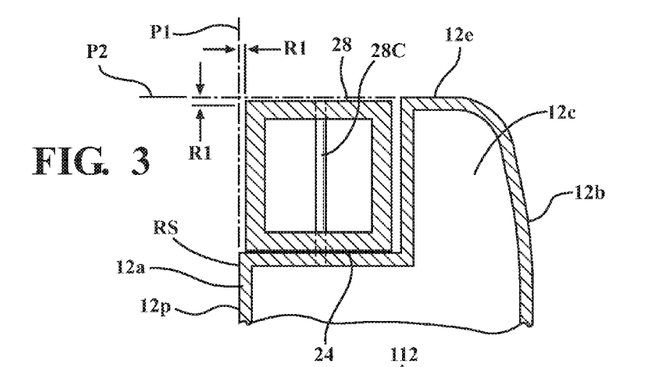
FIG. 3 is a cross-sectional view of a portion of the load support structure embodiment shown in FIGS. 1 and 2, showing a retaining member in a stowed condition.

Referring to FIGS. 1-3, the tailgate 12 may be formed from an inner panel 12a and an outer panel 12b positioned opposite the inner panel and coupled to the inner panel. Inner panel 12a faces toward an interior of the bed 14 when the tailgate is up, and outer panel 12b faces outwardly, toward an exterior of the vehicle when the tailgate is up. Opposed tailgate sidewalls 12y and 12z (which may be formed integrally with inner panel 12a or outer panel 12b or which may be formed separately from either of panels 12a and 12b) extend between the inner and outer panels to define (in conjunction with the panels) a generally hollow interior 12c of the tailgate 12. In the down configuration, the tailgate 12 may be supported by cables 12s as shown in FIG. 2. Also, a support surface 12p (FIG. 2) of inner panel 12a may be structured so as to be coplanar or substantially coplanar with a support surface 14a of the bed 14 when the tailgate 12 is in the down configuration. As used herein, the term "substantially" includes exactly the term it modifies and slight variations therefrom. Thus, the term "substantially coplanar" means exactly coplanar and slight variations therefrom. In the above example of the relationship between adjacent surfaces of the tailgate inner panel 12a and the truck bed 14, variations can include mismatches within normal manufacturing tolerances and assembly, for example. In addition, the term "support surface" refers to a surface of a component (such as the tailgate 12 or a retaining member) which is structured and/or positioned to bear a load exerted by, for example, cargo positioned in the bed 14.

In embodiments described herein, the tailgate 12 has an embodiment of a load support structure (generally designated 20) incorporated therein or attached thereto. The load support structure 20 is configurable to either of a stowed configuration and a raised configuration. A "raised configuration" or condition of an embodiment of the support structure or of one of its constituent retaining members (for example, retaining members 26 and 28 described below) is understood to be a configuration wherein at least a portion of the retaining member is raised at least to some degree out of its respective cavity (as described below), thus no longer residing in its stowed configuration. A "stowed configuration" or condition of an embodiment of the support structure or of one of its constituent retaining members is understood to be a configuration wherein the retaining member is stored within its respective cavity and not in use. In embodiments described herein, when the retaining member is in a stowed condition, the retaining member will generally reside within a cavity formed in a base (as described in greater detail below). In a stowed configuration, the retaining member will generally reside within the cavity and at or below a reference surface RS of a base in which a cavity holding the retaining member is formed. This permits cargo to rest on the reference surface of the base without interference from a stowed retaining member. As described herein, in the raised configuration, the load support structure 20 operates to help prevent a load or cargo carried in the bed 14 from rolling or sliding out of the bed when the tailgate 12 is down.

In embodiments described herein, the support structure includes a base (generally designated B1 in embodiments described herein) having a first elongated cavity and a second elongated cavity formed therein. The second cavity is spaced apart from the first cavity along the base B1. A first retaining member is positioned in first cavity, and a second retaining member is positioned in second cavity. The first retaining member is structured to be positionable in a stowed configuration and also in a raised configuration within the first cavity. The second retaining member is structured to be positionable in a stowed configuration and also in a raised configuration within the second cavity.

A cavity may be generally defined as a depression formed in an exterior surface of the base B1. The depression may be configured for receiving therein at least one retaining member as described herein. The portions of the depression generally reside below some reference such as surface RS of the base B1 in FIG. 3 (for example, a surface forming the tailgate floor) and are dimensioned so that the retaining members may be level with or recessed from the reference surface and into the base (i.e., so that the retaining members do not extend above the reference surface) when the retaining member is stowed. A cavity may be considered to be a single cavity having contiguous portions if a fluid (such as water) introduced into the one portion of the cavity would be able to flow into another portion of the cavity without rising above the level of the reference surface. Thus, depressed portions of a base which are connected such that a fluid may flow as described above may be considered to be portions of a single cavity, for the purposes described herein. Similarly, depressed portions of the base in which fluid must flow from one depressed portion above the level of the reference surface and along the reference surface to reach another depressed portion may be considered to be separate cavities.

The depressions may be formed in any suitable manner. For example, in a base B1 formed from sheet metal, the depression may be formed by stamping. In a base formed from a polymeric material, the depression may be formed by a molding process. For purposes of fabrication, any of the base cavities described herein in which the retaining members are received may be formed as separate cavities and/or as a single cavity having contiguous portions as described above, according to such factors as the fabrication processes used, the desired sizes and arrangement of the cavities, the material(s) from which the base is formed, and other design and manufacturing considerations.

In the particular embodiment shown in FIGS. 1-3 and in other embodiments described herein, the base B1 may be formed by the tailgate inner panel 12a. Also, in the embodiment shown in FIGS. 1-3, a first cavity 22 and a second cavity 24 are formed along a rear edge 12e of the tailgate, which may be formed by a portion of the inner panel. Second cavity 24 is spaced apart from the first cavity 22 along the tailgate rear 12e. A first retaining member 26 is positioned in first cavity 22, and a second retaining member 28 is positioned in second cavity 24. First retaining member 26 is rotatably connected to the remainder of the tailgate 12 (for example, to inner panel 12a or to another portion of the tailgate) so as to be rotatable between a stowed configuration and a raised configuration within the first cavity 22. Also, second retaining member 28 is rotatably connected to the tailgate 12 so as to be rotatable between a stowed configuration and a raised configuration within the second cavity 24. Also, as seen in FIG. 2, each of the first and second cavities 22 and 24 extends along a longitudinal axis X1 extending substantially perpendicular to a fore-aft axis X2 of the vehicle. As used herein, the term "longitudinal" means "placed or going along the long side of something".

The stowed configurations of the retaining members 26 and 28 are shown in FIG. 1, wherein the retaining members reside within their respective cavities. The cavities 22 and 24 and retaining members 26 and 28 may be dimensioned with respect to each other such that longitudinal exterior sides of the retaining members are either flush with or recessed from the exterior surfaces of the inner panel into which the cavities 22 and 24 extend. This condition is shown in the cross-sectional view of FIG. 3 for example, in which the retaining member sides are recessed a distance R1 from planes P1 and P2 defining edges of the cavity 24. Thus, the retaining member 28 is completely nested within the cavity 24. Raised configurations of the retaining members 26 and 28 are shown in FIG. 2. In the raised configuration, the retaining members 26 and 28 act to block or prevent cargo (for example, drywall pieces positioned in the bed 14) from sliding out of the bed during motion of the vehicle. Also, in raised configurations of the retaining members described herein, the retaining members may be structured and coupled to the remainder of the tailgate such that support surfaces of the retaining members (i.e., surfaces facing in a direction toward a front of the vehicle) when raised are coplanar or substantially coplanar. This helps ensure that the cargo-imposed loads are more evenly distributed among the retaining members. For example, in raised configurations of the retaining members 26 and 28 shown in FIG. 2, the retaining members may be structured and coupled to the remainder of the tailgate 12 such that support surfaces 26s and 28s are coplanar or substantially coplanar, within normal manufacturing and assembly tolerances for example. In another example (shown in FIG. 16), the support surfaces of the retaining members 26, 28 and 33 may all be coplanar along a plane PP when the retaining members are raised.

The base B1 may be formed from any suitable material and have any geometry or configuration suitable for the purposes described herein. In the example of FIGS. 1-3, the tailgate inner panel 12a is used as the base. However, the base may be formed from one or more structures which are separate from the base and which may be attached to the tailgate after the tailgate is fabricated.

Any of the retaining members described herein (for example, members 26 and 28) may be rotatably connected to the tailgate 12 using pins or shafts, for example, or by any other suitable means. For example, as seen in FIGS. 2 and 3, first retaining member 26 may be rotatably coupled to the base 12a by a first pin 26c, and second retaining member 28 may be rotatably coupled to the base 12a by a second pin 28c. Any of the retaining members described herein may also be lockable in either of the stowed or raised positions using any of a variety of known methods (for example, spring-loaded pins, mechanical fasteners, etc.). The locking mechanism (not shown) may be released or deactivated to enable rotation of the retaining members from one configuration to another. Alternatively, any of the retaining members may be maintained in either of the stowed or raised positions using suitable interference fits formed between the retaining members and the walls of their respective cavities to provide detent mechanisms.

Retaining members 26 and 28 may have any suitable shape(s) and may be formed from any suitable material (for example, steel, aluminum, or polymeric materials). In one example, retaining members 26 and 28 each have a hollow, tubular structure with a rectangular cross-section as shown in FIGS. 1-3.

Figures 6, 7, 8:
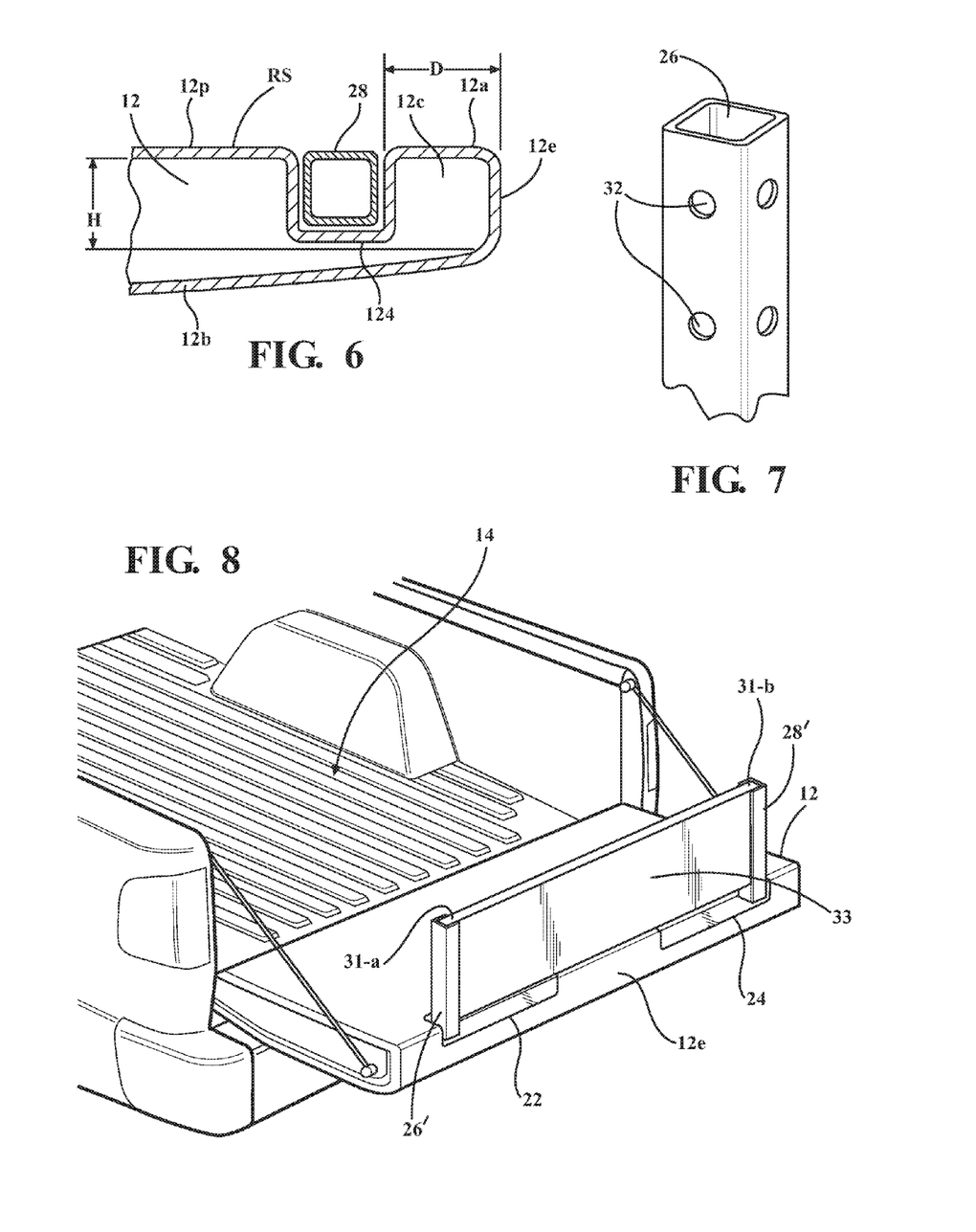
FIG. 6 is a cross-sectional view of a portion of the embodiment shown in FIG. 5.
FIG. 7 is a perspective view of portion of an embodiment of a retaining member having holes formed therealong.
FIG. 8 is a schematic perspective view of a particular embodiment of the retaining members incorporated into a load support structure as described herein.
Figure 8A:
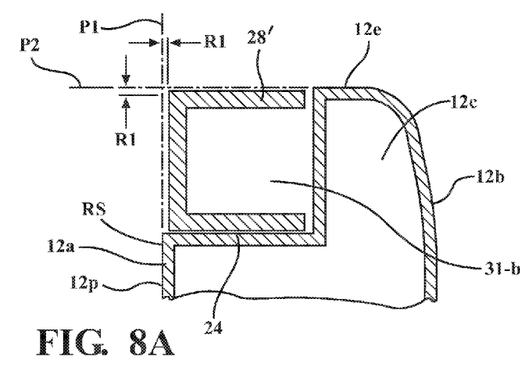
FIG. 8A is a cross-sectional view of a portion of the load support structure embodiment shown in FIG. 8, showing a retaining member in a stowed condition.

In particular embodiments, the opposed retaining members each have a slot or opening extending along a length of the retaining member. In a particular embodiment, the opening is a "C" or channel-shaped opening as shown in the examples of FIGS. 8 and 8A. In the embodiment of FIG. 8, a retaining member 26' has an opening 31-a and a retaining member 28' has an opening 31-b. In addition, the first and second retaining members 26' and 28' are connected to the base B1 so that opening 31-a of the first retaining member 26' faces opening 31-b of the second retaining member 28' when the first and second retaining members are in the raised configuration. Openings 31-a and 31-b are structured to receive therein opposite ends of a barrier member (such as barrier member 33 shown in FIG. 8) when the retaining members 26' and 28' are in raised configurations. In this arrangement, the retaining members act to support the barrier member 33, which blocks and prevents items of cargo from exiting the bed 14 between the retaining members during vehicle use. The barrier member 33 may be formed, for example, by a wood panel or board having a length dimensioned to span the openings 31-a and 31-b and the distance between them.

In certain embodiments, one or more of the retaining members and may include holes formed in walls of the retaining member(s) to enable attachment of ropes or bungee cords to the retaining members. FIG. 7 shows one example of a retaining member 26 having holes 32 formed therealong. Also, in certain embodiments, one or more of the retaining members and may include projections (for example, buttons or hooks) extending from outer surfaces thereof, to enable attachment of ropes, mesh or netting to the retaining members. Such cords, mesh and netting can extend between adjacent retaining members to aid in preventing cargo from exiting the bed 14 during vehicle movement. FIGS. 20 and 21 show an example of a retaining member 26 having projections 37 formed therealong. In addition, in certain embodiments, one or more of the retaining members may include both projections 37 and holes 32 formed therein.

In operation of the load support structure embodiment shown in FIGS. 1-3, the retaining members 26 and 28 may be raised in the directions indicated by the arrows (FIG. 2) after deactivation of any locking mechanisms or rotation of the retaining members past any detent mechanism helping to maintain the retaining members in the stowed configuration. The retaining members 26 and 28 may also be lowered in the reverse direction after deactivation of any locking mechanisms or rotation of the retaining members past any detent mechanism helping to maintain the retaining members in the raised configuration.

In the embodiment shown in FIGS. 1-3, the first retaining member 26 is structured to be rotatable in a direction away from the second retaining member 28 to its raised configuration, and the second retaining member 28 is structured to be rotatable in a direction away from the first retaining member 26 to its raised configuration.

Figure 24:
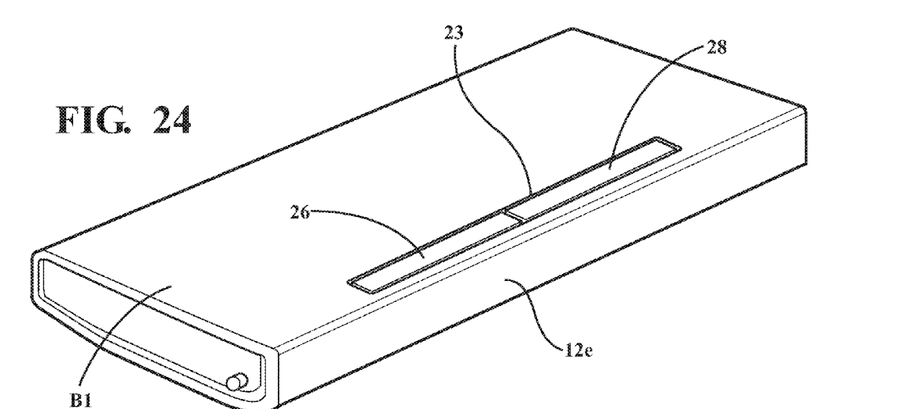
FIG. 24 is a schematic perspective view of another embodiment of a load support structure, showing the retaining members is a stowed condition.

FIG. 24 shows an alternative embodiment similar to the embodiment of FIGS. 1-3. In FIG. 24, both of retaining members 26 and 28 are stowed in a single cavity 23 formed in the base. The retaining members rotatably coupled to the base within the cavity and may be raised as shown in FIG. 2.

In other alternative embodiments (for example, the embodiment shown in FIG. 5), the first retaining member 26 may be structured to be rotatable in a direction toward the second retaining member 28 to reach its raised configuration, and the second retaining member 28 is structured to be rotatable in a direction toward the first retaining member 26 to reach its raised configuration.

Figures 25, 26:
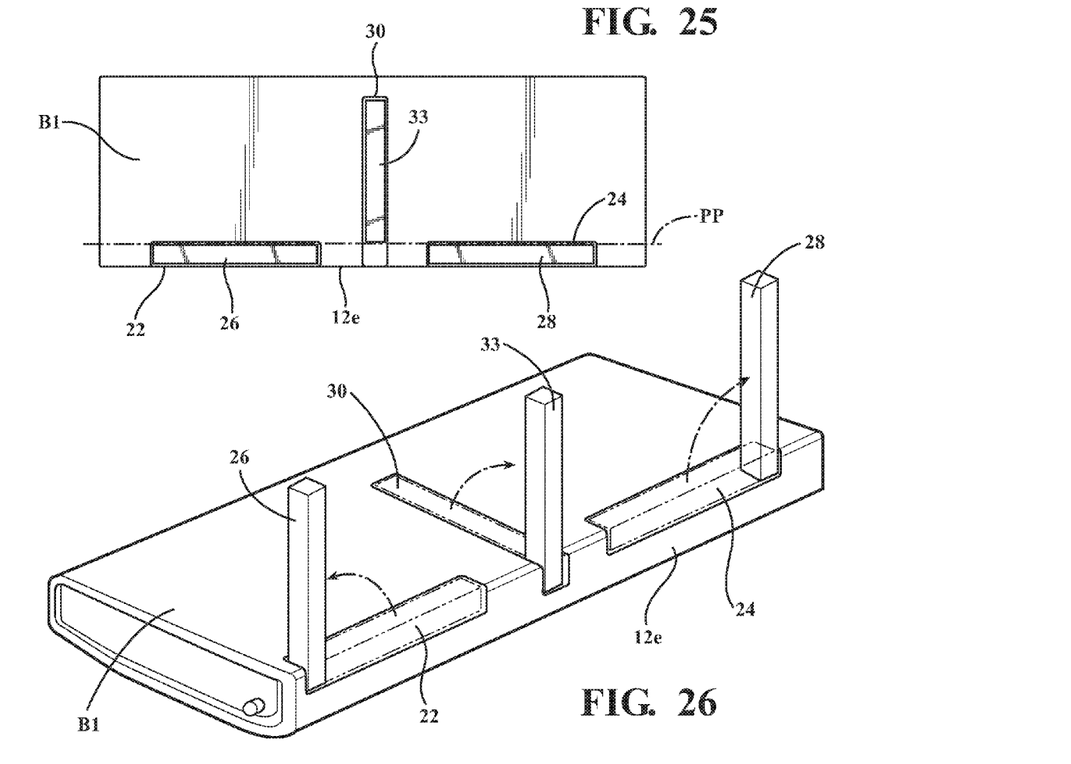
FIG. 25 is a schematic plan view of a load support structure in accordance with an alternative embodiment described herein, showing the retaining members in a stowed condition.
FIG. 26 is a schematic perspective view of the load support structure shown in FIG. 25, showing the retaining members in a raised condition.

In some embodiments, one or more additional elongated cavities may be provided in the base, and one or more corresponding additional retaining members may be positionable in one of a stowed configuration and a raised configuration within corresponding ones of the additional cavities. FIG. 25 is a plan view of a load support structure in accordance with an alternative embodiment described herein, showing the load support structure in a stowed condition. FIG. 26 is a perspective view of the load support structure shown in FIG. 25, showing the load support structure in a raised condition. Referring to FIG. 25 for example, in an embodiment similar to the one shown in FIGS. 1-3, a third cavity 30 is formed in the base B1 (in this case, tailgate inner panel 12a) along the rear edge of the tailgate, and a third retaining member 33 is rotatably connected to the remainder of the tailgate so as to be rotatable between a stowed configuration and a raised configuration within the third cavity 30. Cavity 30 may extend along an axis parallel or substantially parallel with the vehicle fore-aft axis X2. While first retaining member 26 and second retaining member 28 may be raised as shown previously in FIG. 2, third retaining member 33 may be raised from cavity 30 as shown in FIG. 26, in a direction toward a rear of the vehicle to bring it into the raised configuration. This configuration distributes the cargo-induced loads among three retaining members instead of two.

In certain embodiments described herein, the various retaining member cavities may be spaced apart from edges of the tailgate 12. For example, FIGS. 4-6, 9-19, and 22-24 show embodiments where the retaining member cavities and their associated retaining members are spaced apart from the rear edge and the side edges of the tailgate.

Figure 4:
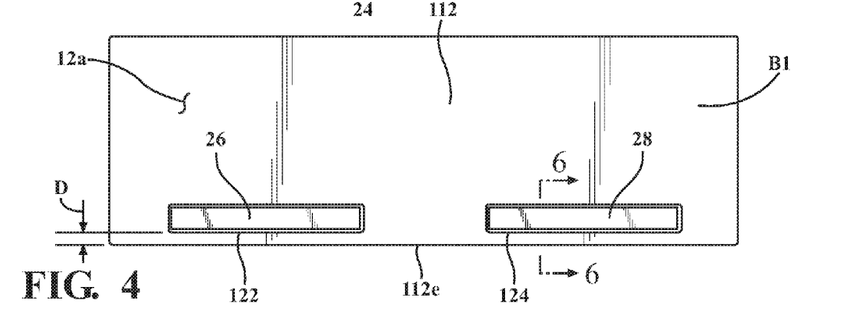
FIG. 4 is a schematic plan view of a load support structure embodiment similar to that described with respect to FIGS. 1-3, but with the cavities and the retaining members spaced apart from a rear edge of the tailgate.
Figure 5:
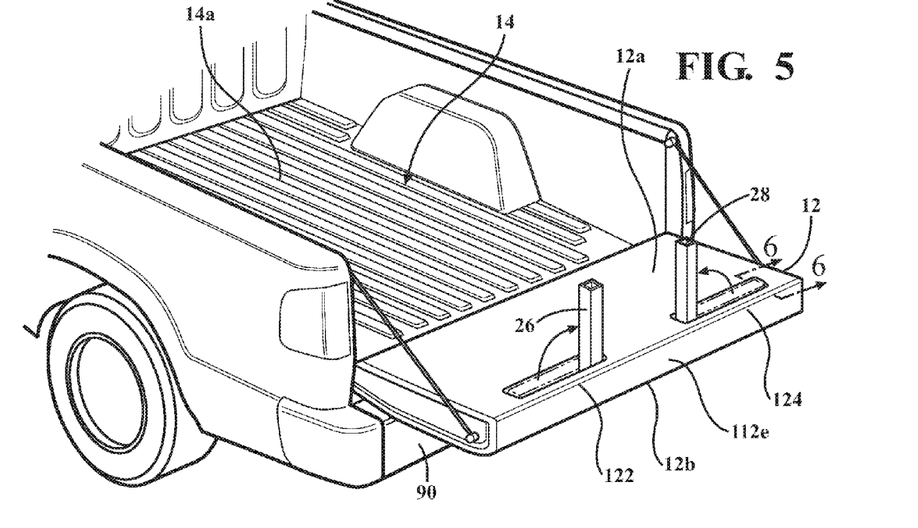
FIG. 5 is a schematic perspective view of the embodiment shown in FIG. 4.

FIGS. 4, 5, and 6 show an embodiment similar to that described with respect to FIGS. 1-3, but with the cavities 122 and 124 spaced apart from the tailgate rear 112e a distance D. The cavities 122, 124 and associated retaining members are also spaced apart from the other edges of the tailgate. The retaining members shown in FIGS. 4, 5, and 6 may also be connected to the remainder of the tailgate and raised and lowered as previously described with respect to FIGS. 1-3. FIG. 6 also shows a cross-sectional view of an exemplary cavity 124 formed in the tailgate inner panel 12a. Other cavities may be formed in a similar fashion. The inner panel 12a may be fabricated from metallic material (such as sheet metal), a polymeric material, or any other suitable material. In a sheet metal component, the cavity 124 may be stamped or otherwise formed, for example. The hollow region 12c of minimum depth H accommodates the deformation or forming of the inner panel 12a to produce the cavity 124.

Figures 16, 17:
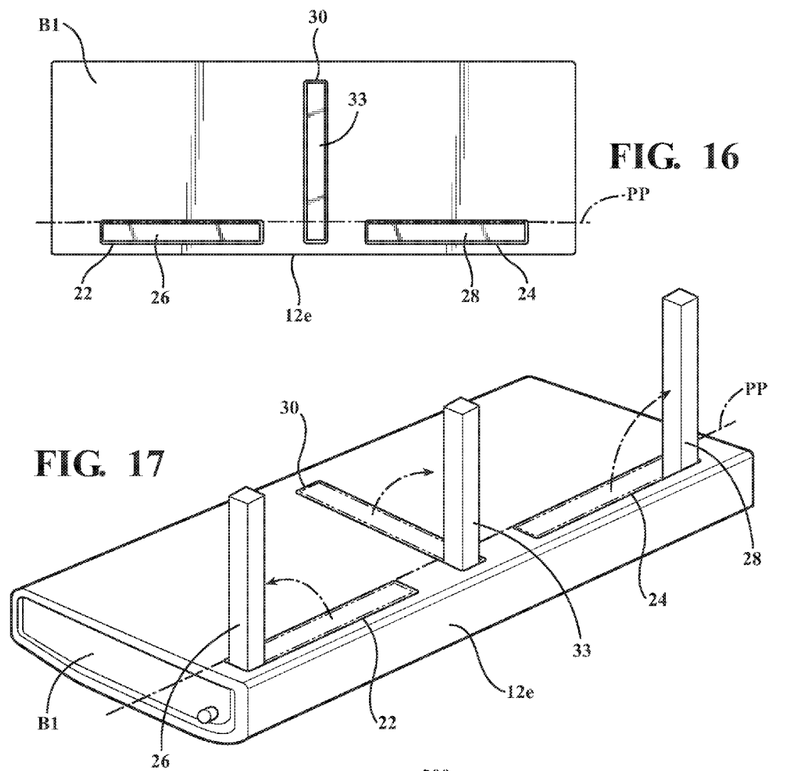
FIG. 16 is a schematic plan view of a load support structure in accordance with another embodiment described herein, showing the retaining members in a stowed configuration.
FIG. 17 is a schematic perspective view of the embodiment shown in FIG. 16, showing the retaining members in a raised configuration.

FIGS. 16 and 17 show an embodiment similar to the embodiment in FIGS. 25 and 26. In the embodiment of FIG. 16, the cavities 22, 24 and 30 are spaced apart from edges of the tailgate, as shown in FIG. 4. The retaining members 26, 28 and 33 may be rotatably connected to the base B1 and may be rotatable into their raised configurations as set forth previously in the description of FIGS. 25 and 26.

Figure 18:
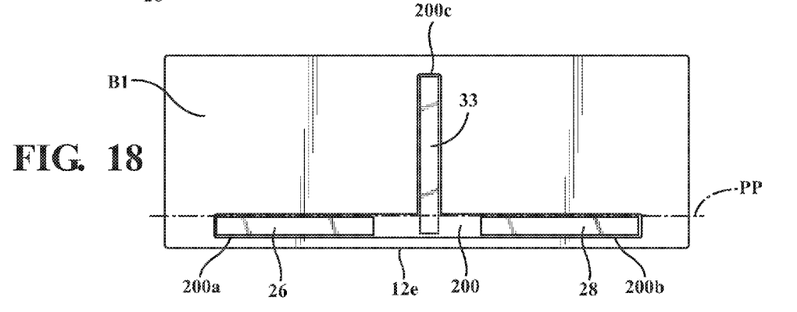
FIG. 18 is a schematic plan view of an embodiment similar to the embodiment in FIGS. 16 and 17.

FIG. 18 shows an embodiment similar to the embodiment in FIGS. 16 and 17. In the embodiment of FIG. 18 however, the retaining members 26, 28 and 33 are positioned within a single cavity 200 formed in the base B1. The cavity 200 includes three contiguous or adjoining portions 200a, 200b and 200c, with each portion configured for receiving an associated one of retaining members 26, 28 and 33 therein. The retaining members 26, 28 and 33 may be rotatably connected to the base B1 and may be rotatable into their raised configurations as set forth previously in the description of FIGS. 16 and 17.

Figure 19:
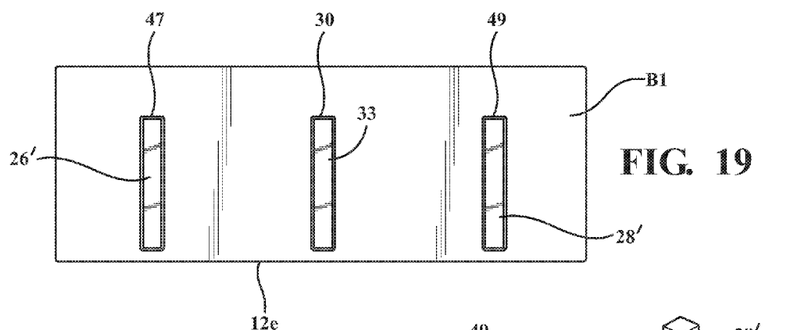
FIG. 19 is a schematic plan view show another alternative embodiment of the load support structure, with the retaining members in a stowed configuration.
Figures 19A, 20, 21:
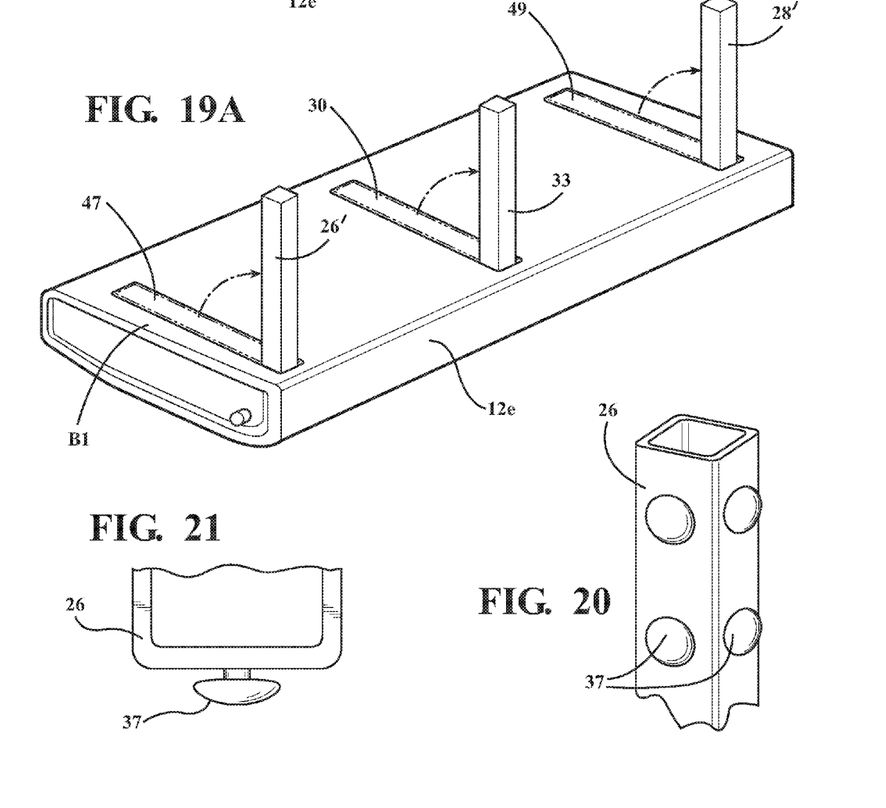
FIG. 19A is a schematic perspective view of the embodiment shown in FIG. 19, showing the retaining members in a raised configuration.
FIG. 20 is a schematic perspective view of a portion of a retaining member having projections formed therealong.
FIG. 21 is a schematic cross-sectional plan view of a portion of the retaining member of FIG. 20.

FIGS. 19 and 19A show another alternative embodiment of the load support structure. In this embodiment, all of the cavities 47, 30, and 49 may extend along axes parallel or substantially parallel with the vehicle fore-aft axis X2. In addition, the retaining members 26', 33, and 28' may be raised from their respective cavities as shown in FIG. 19A, in a direction toward a rear of the vehicle to bring them into raised configurations. This configuration also distributes the cargo-induced loads among three retaining members instead of two.

Figure 22:
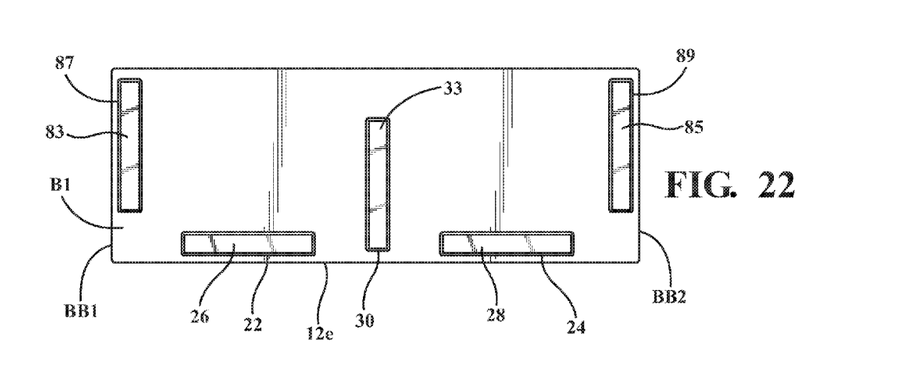
FIG. 22 is a schematic plan view of another embodiment of a load support structure, showing the retaining members is a stowed condition.
Figure 23:
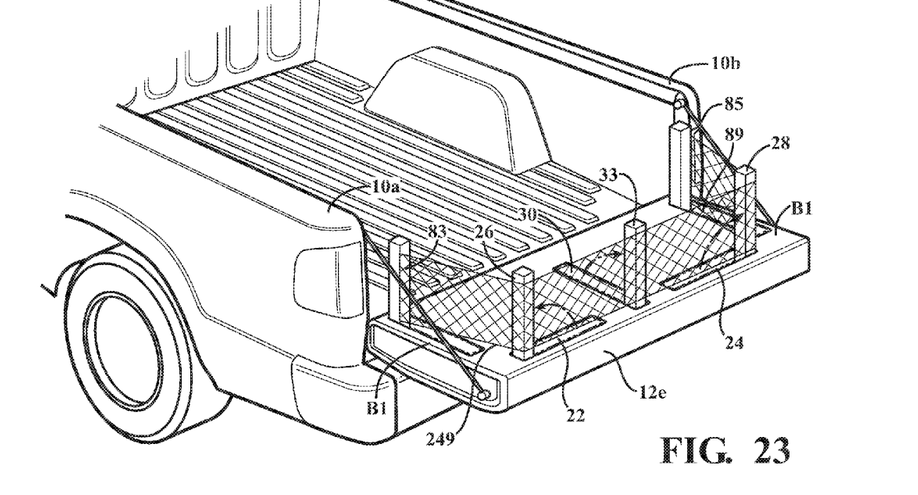
FIG. 23 is a schematic perspective view of the embodiment shown in FIG. 22, showing the retaining members is a raised condition.

FIGS. 22 and 23 show another alternative embodiment of the load support structure. In this embodiment, the cavities 22, 24, and 30 and the retaining members 26, 28, and 33 are configured similarly to similarly-positioned cavities and the retaining members shown in FIGS. 16 and 17. Also, additional cavities 87 and 89 and additional associated retaining members 83 and 85 are positioned spaced apart from opposite side edges BB1 and BB2 of the base B1. Retaining members 83 and 85 may be rotated in the directions shown (i.e., in a direction toward the front of the vehicle) to bring them into raised configurations. When the retaining members 83, 26, 33, 28, and 85 are raised as shown in FIG. 23, a curtain or barrier 249 (formed from a mesh or netting, for example) may be attached to the retaining members (using projections such as projections 37 shown in FIGS. 20 and 21, for example) so as to be supported by and extend between the retaining members. This embodiment is configured to aid in preventing cargo from falling out of the sides of the tailgate through gaps between retaining member 83 and adjacent truck bed wall 10a, and between retaining member 85 and adjacent truck bed wall 10b.

Figure 29:
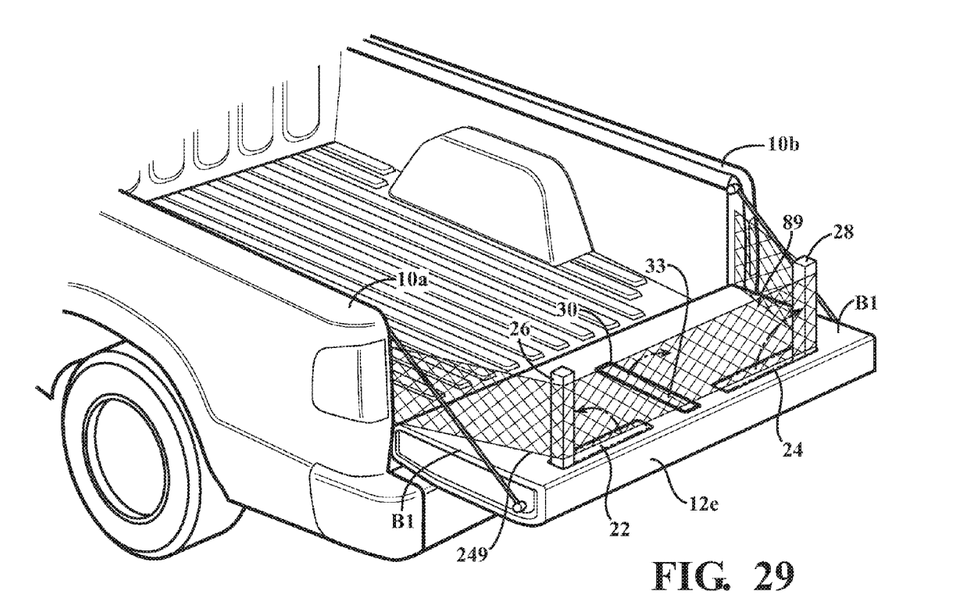
FIG. 29 is a schematic perspective view of another embodiment of a load support structure.

Referring to FIG. 29, in a particular embodiment similar to the embodiment shown in FIG. 23, retaining members 83, 33 and 85 of FIG. 23 may be omitted or left in their stowed configurations, and a barrier similar to barrier 249 of FIG. 23 may be supported by and extend between retaining members 26 and 28. The barrier may also be attached to bed wall 10a and extend between the bed wall 10a and retaining member 26. The barrier may also be attached to bed wall 10b and extend between retaining member 28 and bed wall 10b. Thus, opposite ends of the barrier are supported by bed walls 10a and 10b instead of by retaining members 83 and 85. This may eliminate gaps or open regions left between retaining member 83 and bed wall 10a, and between retaining member 85 and bed wall 10b.

In another particular embodiment similar to the embodiment shown in FIG. 29, the retaining member 33 may be included or raised, and the barrier 249 may extend between retaining members 83, 33 and 85, with opposite ends of the barrier attached to associated opposite bed walls as shown in FIG. 29.

The embodiments shown in FIGS. 9-15 illustrate an alternative method for mounting and securing the retaining members in a raised configuration. Any of the retaining member arrangements previously described may be implemented using the alternative mounting and securement method described with respect to FIGS. 9-15. In these embodiments, the retaining members may be secured in their stowed conditions using an interference fit or any other suitable method, as previously described. In addition, the retaining members are not rotatably coupled to the base B1, but rather may be completely removed from their respective cavities or cavity portions, if desired.

Figure 9:
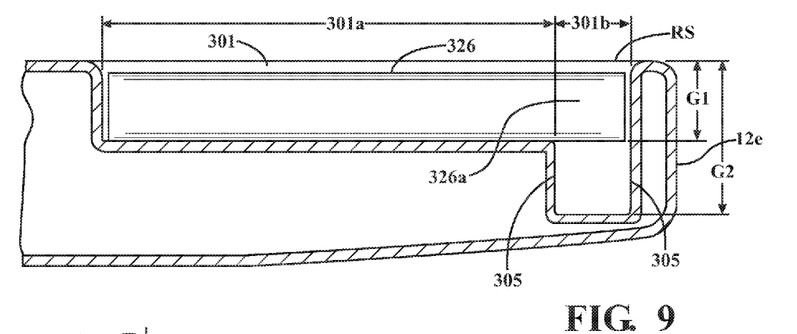
FIG. 9 shows a schematic cross-sectional side view of a base cavity containing a retaining member in a stowed configuration, in accordance with an alternative embodiment described herein.
Figure 10:
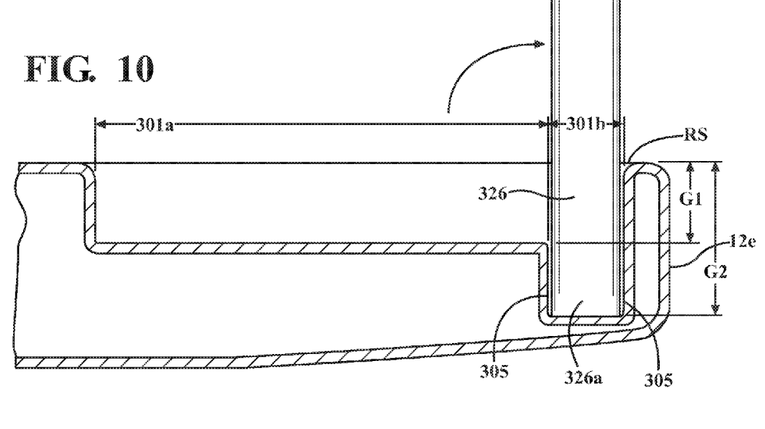
FIG. 10 is the cross-sectional view of FIG. 9 showing the retaining member secured in a raised configuration.
Figure 11:
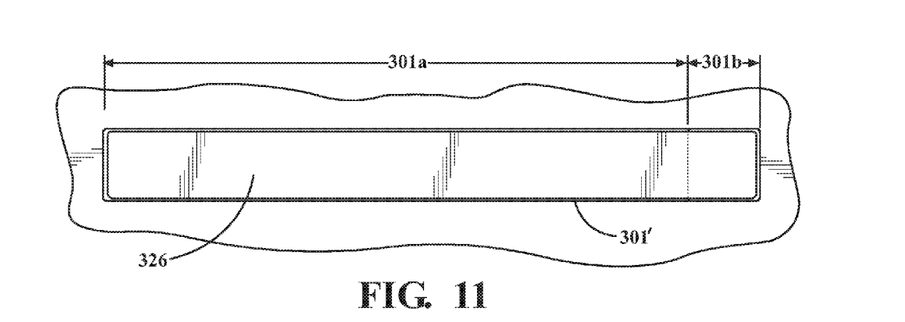
FIG. 11 is a schematic plan view of the base cavity and retaining member shown in FIG. 9, with the retaining member in the stowed condition.

FIG. 9 shows a cross-sectional side view of a base cavity 301 containing a retaining member 326 in a stowed configuration, in accordance with an alternative embodiment described herein. FIG. 10 is the cross-sectional view of FIG. 9 showing the retaining member 326 secured in a raised configuration. FIG. 11 is a plan view of the base cavity 301 and retaining member shown in FIG. 9, with the retaining member 326 in the stowed condition.

Referring to FIGS. 9-11, in one particular embodiment, cavity 301 containing retaining member 326 may have a first portion 301a with an associated first depth G1, and a second portion 301b with an associated second depth G2. The second depth G2 is greater than the first depth G1 and is dimensioned to permit an end 326a of the retaining member stored in the cavity 301 to be inserted and supported therein by walls 305 of the cavity second portion 301b. The end 326a of the retaining member 326 may be retained in the raised configuration by walls 305 and/or by one or more features (such as projections extending from walls) which act to provide an interference fit between the walls 305 and the retaining member 326. When it is desired to stow the retaining member 326 in the cavity 301 (as shown in FIGS. 9 and 11), the retaining member 326 may be removed from the cavity second portion 301b and stowed in the cavity, along the length of the cavity.

Figure 12:
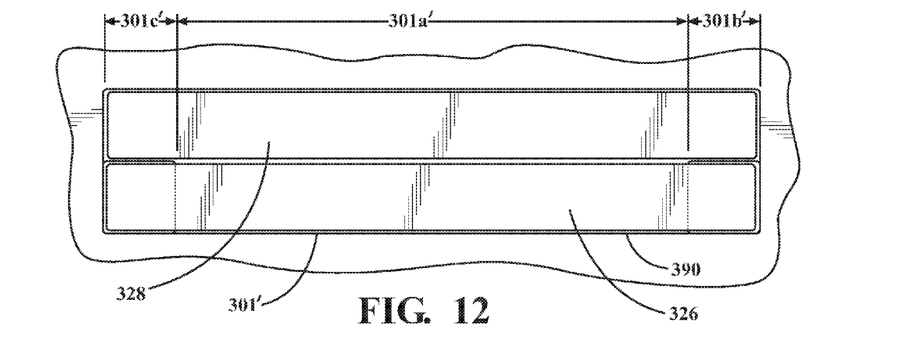
FIG. 12 shows a schematic plan view of another alternative embodiment of an arrangement of a cavity and associated retaining members.

FIG. 12 shows a plan view of another alternative embodiment of an arrangement of a cavity and associated retaining members. Referring to FIG. 12, the cavity 301' is structured for stowing a pair of retaining members 326 and 328 side by side within the cavity. Cavity 301' has a first portion 301a' with a first depth G1 as described with respect to FIGS. 9-10. Cavity 301' also has a relatively deeper second portion 301b' at one end thereof and a relatively deeper third portion 301c' at an opposite end thereof. Deeper portions 301b'' and 301c' are similar to deeper portion 301b as previously described with respect to FIG. 9. Cavity portions 301b' and 301c' have depths G2 greater than the depth G1, as previously described. Thus, when retaining members 326 and 328 are removed from stowage in the cavity 301', one of the retaining members 326 and 328 may be inserted into cavity second portion 301b' and the other one of the retaining members 326 and 328 may be inserted into the cavity third portion 301c', as previously described, so that the retaining members reside in raised configurations within the cavity 301'. When it is desired to stow the retaining members 326 and 328 in the cavity 301' (as shown in FIG. 12), the retaining members 326 and 328 may be removed from the cavity second portion 301b' and cavity third portion 301c' and stowed in the cavity 301', along the length of the cavity. In the embodiment shown in FIG. 12, a wall 390 of the cavity 301' defining portions of the relatively deeper cavity second and third portions 301b' and 301c' may be the portion of the cavity 301' positioned closest to a rear edge (not shown) of the tailgate, to allow maximum space for cargo in the tailgate.

Figure 13:
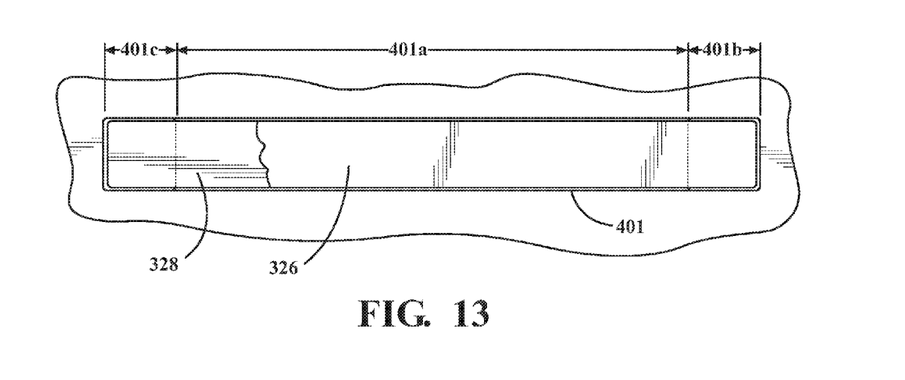
FIG. 13 shows a schematic plan view of another alternative embodiment of a cavity, with a pair of retaining members and in a stowed configuration.
Figure 14:
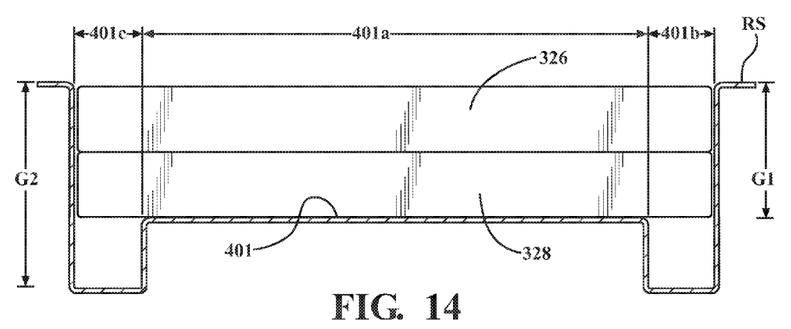
FIG. 14 shows a schematic side cross-sectional view of the embodiment shown in FIG. 13.
Figure 15:
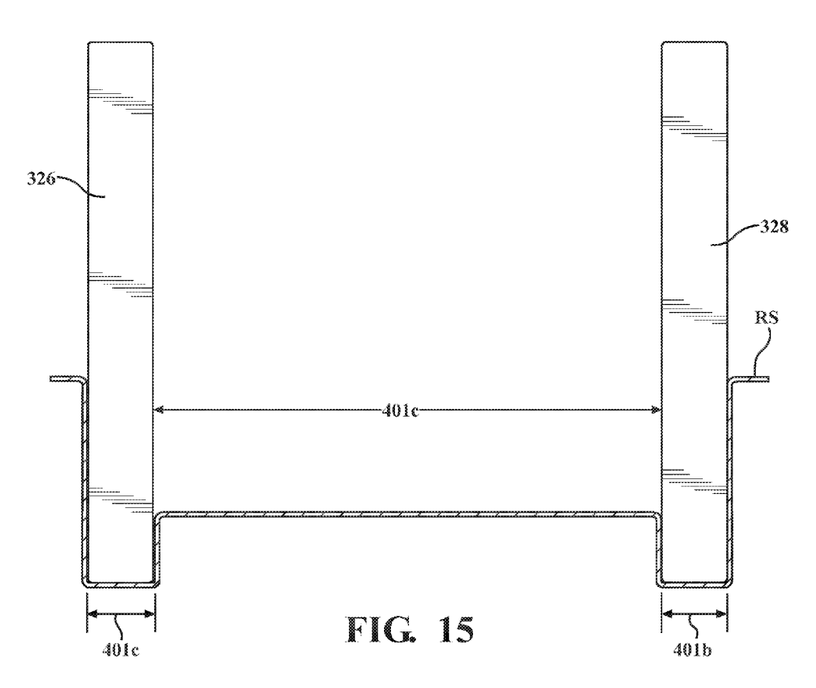
FIG. 15 is the schematic cross-sectional view of FIG. 14 showing the retaining members in a raised configuration.

FIG. 13 shows a plan view of another alternative embodiment 401 of a cavity, with a pair of retaining members 326 and 328 in a stowed condition. FIG. 14 shows a side cross-sectional view of the embodiment shown in FIG. 13. FIG. 15 is the cross-sectional view of FIG. 14 showing the retaining members 326 and 328 in a raised condition. Referring to FIGS. 13-15, the cavity 401 is structured for stowing a pair of retaining members 326 and 328 two-deep within the cavity. Each end of the cavity 401 has a relatively deeper portion (portions 401b and 401c) similar to the deeper portion 301b in FIGS. 9 and 10. Each of the stacked retaining members 326 and 328 in FIGS. 13-15 may be removed from the cavity 401 and positioned in one of the deeper portions 401b and 401c in the manner previously described, to provide a raised condition of the retaining members as shown in FIG. 15. The retaining members 326 and 328 may be maintained in the stowed orientation by an interference fit formed between the cavity 401 and one or more portions of the retaining member(s), as previously described, or using any other suitable means.

Figure 27:
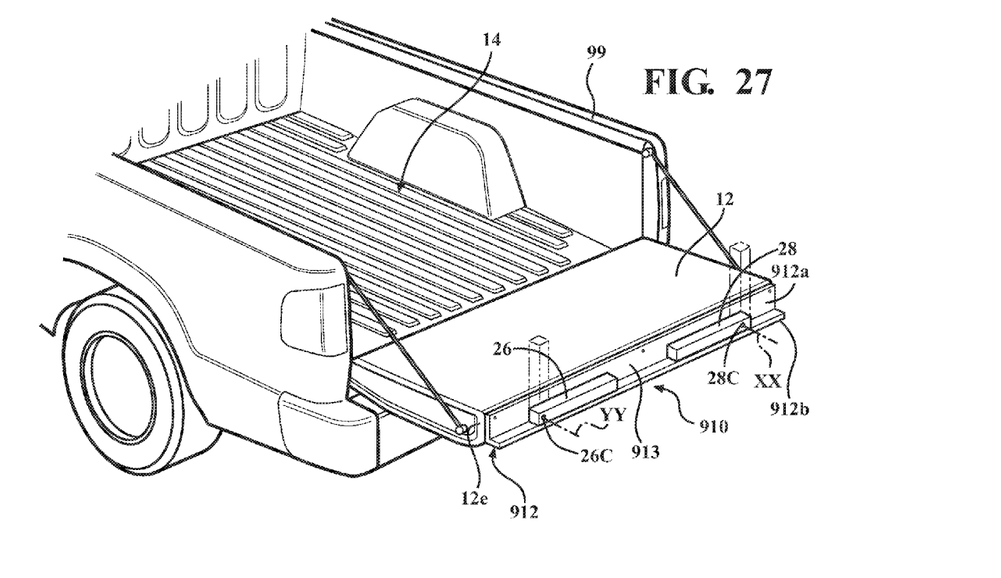
FIG. 27 is a perspective view of a rear portion of a vehicle incorporating a load support structure in accordance with an alternative embodiment described herein, showing a vehicle tailgate in a down or open orientation.
Figure 28:
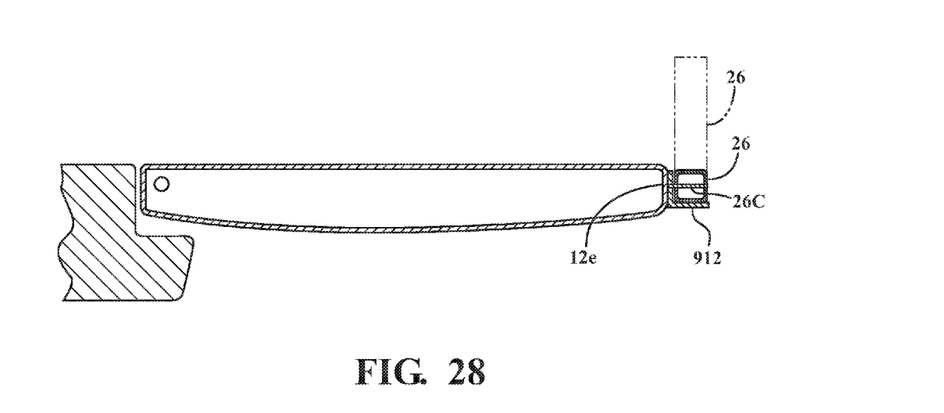
FIG. 28 is a partial side view of the embodiment shown in FIG. 27.

FIGS. 27 and 28 show another embodiment 910 of a load support structure. In this embodiment, the base of the load support structure is formed by a bracket 912 (for example, an "L"-shaped bracket) which may be attached to tailgate rear edge 12e using any suitable attachment method (for example, bolts). A pair of retaining members 26 and 28 is rotatably coupled to the bracket 912 along rotational axes XX and YY, in a manner similar to that previously described with respect to FIGS. 1 and 2. Retaining members 26 and 28 are rotatable as previously described between the stowed configuration (shown as a solid leader to retaining member 26 in FIG. 28) and the raised configuration (shown as a dashed leader to the retaining member). The load support structure may also incorporate detents or locking mechanisms (not shown) suitable for maintaining the retaining members in a selected one of the raised or stowed configurations. This embodiment enables a load support structure as described herein to be quickly, easily and inexpensively added on to an existing vehicle having no built-in load support structure.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A load support structure for a vehicle tailgate, the structure comprising:
   a base incorporated into the tailgate;
   a first retaining member positionable in either of a stowed configuration and a raised configuration within a cavity formed in the base and extending perpendicular to an inner surface of the tailgate; and
   a second retaining member separate from the first retaining member and positionable in either of a stowed configuration and a raised configuration within a cavity formed in the base and extending perpendicular to an inner surface of the tailgate and,
   wherein the load support structure is structured such that each of the first and second retaining members has a first end securable to the base, and a second, free end opposite the first end and spaced apart from the base when the retaining member is in the raised configuration,
   wherein the cavity in which the first retaining member is positionable in either of the stowed configuration and the raised configuration is a first cavity, and wherein the cavity in which the second retaining member is positionable in either of the stowed configuration and the raised configuration is a second cavity separate and spaced apart from the first cavity,
   and wherein the first cavity and the second cavity are formed in a portion of the tailgate structured to form a rear edge of the tailgate when the tailgate is in a lowered position.

2. The structure of claim 1 further comprising a third cavity formed in the base, and a third retaining member positionable in either of a stowed configuration and a raised configuration within the third cavity, wherein the third cavity extends along an axis substantially parallel with a fore-aft axis of the vehicle, and wherein the third cavity is formed in the portion of the tailgate structured to form the rear edge of the tailgate when the tailgate is in a lowered position.

3. The structure of claim 1 wherein the first retaining member is rotatably coupled to the base so as to be rotatable in a first direction, and the second retaining member is rotatably coupled to the base so as to be rotatable in a second direction opposite the first direction.

4. The structure of claim 3 wherein the first retaining member is rotatable in a direction away from the second retaining member to a raised configuration, the second retaining member is rotatable in a direction away from the first retaining member to a raised configuration.

5. A load support structure for a vehicle tailgate, the structure comprising:
   a base incorporated into the tailgate;
   a first retaining member positionable in either of a stowed configuration and a raised configuration within a first cavity formed in the base;
   a second retaining member separate from the first retaining member and positionable in either of a stowed configuration and a raised configuration within a second cavity formed in the base, the second cavity being separate and spaced apart from the first cavity;
   a third cavity formed in the base;
   a third retaining member positionable in either of a stowed configuration and a raised configuration within the third cavity;
   a fourth cavity and a fifth cavity formed in the base a fourth retaining member positionable in either of a stowed configuration and a raised configuration within the fourth cavity; and
   a fifth retaining member positionable in either of a stowed configuration and a raised configuration within the fifth cavity.

6. The structure of claim 5 further comprising a barrier extending between the first and second retaining members when the first and second retaining members are in a raised configuration.

7. The structure of claim 6 wherein the barrier extends between the first retaining member and a first truck bed wall, and also extends between the second retaining member and a second truck bed wall opposite the first bed wall when the first and second retaining members are in the raised configurations.

8. The structure of claim 5 wherein the first, second, and third cavities all extend along axes parallel or substantially parallel with a fore-aft axis of the vehicle.

9. A load support structure for a vehicle tailgate, the structure comprising:
   a base incorporated into the tailgate;
   at least a first cavity formed in the base; and
   a first retaining member positionable in either of a stowed configuration and a raised configuration within the at least a first cavity;
   the at least a first cavity having a first cavity portion with an associated first depth and a second cavity portion with an associated second depth, the associated second depth being greater than the associated first depth,
   wherein an end of the first retaining member is movable from the associated first depth of the at least a first cavity to the associated second depth of the at least a first cavity to secure the first retaining member in the raised configuration within the at least a first cavity.

10. The structure of claim 9 wherein the first retaining member is completely removable from the at least a first cavity and detachable from the base, to enable movement of the end of the first retaining member from the associated first depth of the at least a first cavity to the associated second depth of the at least a first cavity to secure the first retaining member in the raised configuration within the at least a first cavity.

11. The structure of claim 9 further comprising a second cavity formed in the base, a second retaining member positionable in either of a stowed configuration and a raised configuration within the second cavity, the second cavity having a first cavity portion with an associated first depth and a second cavity portion with an associated second depth, the associated second depth being greater than the associated first depth, wherein an end of the second retaining member is movable from the associated first depth of the second cavity to the associated second depth of the second cavity to secure the second retaining member in the raised configuration within the second cavity.

12. The structure of claim 11 wherein each of the first and second cavities extends along a longitudinal axis extending substantially parallel to a fore-aft axis of the vehicle, wherein the structure further comprises a third cavity formed in the base, and a third retaining member positionable in either of a stowed configuration and a raised configuration within the third cavity, wherein the third cavity extends substantially parallel to a fore-aft axis of the vehicle, and wherein at least a portion of the third cavity extends between the between the first and second cavities.

13. The structure of claim 11 wherein the first cavity and the second cavity are spaced apart from a rear edge of the tailgate.

14. The structure of claim 11 wherein each of the first and second cavities extends along a longitudinal axis extending substantially perpendicular to a fore-aft axis of the vehicle, wherein the structure further comprises a third cavity formed in the base, and a third retaining member positionable in either of a stowed configuration and a raised configuration within the third cavity, wherein the third cavity extends substantially parallel to a fore-aft axis of the vehicle, and wherein a portion of the third cavity extends between the between the first and second cavities.

15. The structure of claim 9 wherein the second cavity portion is located at an end of the at least a first cavity.

16. The structure of claim 9 wherein the wherein the at least a first cavity includes a second retaining member positionable in either of a stowed configuration and a raised configuration within the at least a first cavity, the at least a first cavity having a third cavity portion with an associated depth greater than the associated first depth of the first cavity portion, wherein an end of the second retaining member is movable from the associated first depth of the at least a first cavity portion to the associated depth of the third cavity portion to secure the second retaining member in the raised configuration within the at least a first cavity.

17. The structure of claim 16 wherein the second cavity portion is located at a first end of the at least a first cavity, and the third cavity portion is located at a second end of the at least a first cavity opposite the first end.

* * * * *